(12) United States Patent
Kachoosangi

(10) Patent No.: US 9,453,532 B2
(45) Date of Patent: Sep. 27, 2016

(54) SLIDING BEARING

(71) Applicants: Mahle International GmbH, Stuttgart (DE); Mahle Engine Systems UK Limited, Warwickshire (GB)

(72) Inventor: Roohollah Kachoosangi, Oxfordshire (GB)

(73) Assignee: Mahle International GmbH (DE)

( * ) Notice: Subject to any disclaimer, the term of this patent is extended or adjusted under 35 U.S.C. 154(b) by 74 days.

(21) Appl. No.: 14/363,453

(22) PCT Filed: Dec. 6, 2012

(86) PCT No.: PCT/GB2012/053035
§ 371 (c)(1),
(2) Date: Jun. 6, 2014

(87) PCT Pub. No.: WO2013/083985
PCT Pub. Date: Jun. 13, 2013

(65) Prior Publication Data
US 2014/0348450 A1    Nov. 27, 2014

(30) Foreign Application Priority Data

Dec. 8, 2011 (GB) .................................. 1121150.5

(51) Int. Cl.
*F16C 33/12* (2006.01)
*F16C 33/14* (2006.01)
(Continued)

(52) U.S. Cl.
CPC .............. *F16C 33/121* (2013.01); *B82Y 30/00* (2013.01); *C25D 3/30* (2013.01); *C25D 3/32* (2013.01); *C25D 3/60* (2013.01); *C25D 7/10* (2013.01);
(Continued)

(58) Field of Classification Search
CPC ...... B82Y 30/00; F16C 33/14; F16C 33/121; F16C 33/124; F16C 17/02; F16C 22/122; F16C 33/24; F16C 33/28; F16C 33/06; F16C 2204/12; F16C 2206/02; C25D 3/32; C25D 3/60; C25D 7/10; C25D 3/30
USPC ......... 384/95, 129, 276, 282, 907, 911–912; 428/323, 689, 908.8; 205/205, 300, 205/261; 29/898.042, 898.058–898.059, 29/898.14
See application file for complete search history.

(56) References Cited

U.S. PATENT DOCUMENTS 5,547,748 A * 8/1996 Ruoff ..................... A61K 33/24
                                                          423/439
7,625,426 B2 * 12/2009 Lin ........................ B01D 53/02
                                                          210/500.1
(Continued)

FOREIGN PATENT DOCUMENTS

CN         1800668 A    7/2006
CN       100572841 C   12/2009
(Continued)

OTHER PUBLICATIONS

English Abstract for WO2010/054619A2.
(Continued)

*Primary Examiner* — Marcus Charles
(74) *Attorney, Agent, or Firm* — Fishman Stewart PLLC

(57) ABSTRACT

A sliding bearing having a composite layer comprising carbon nanostructures (6) incorporated within a metallic matrix (5), and a method of manufacture of such a sliding bearing by electroplating.

21 Claims, 1 Drawing Sheet

(51) Int. Cl.

| | | |
|---|---|---|
| *C25D 3/30* | (2006.01) | |
| *C25D 3/60* | (2006.01) | |
| *C25D 7/10* | (2006.01) | |
| *B82Y 30/00* | (2011.01) | |
| *C25D 3/32* | (2006.01) | |
| *F16C 17/02* | (2006.01) | |

(52) U.S. Cl.
CPC ............. *F16C 33/124* (2013.01); *F16C 33/14* (2013.01); *F16C 17/02* (2013.01); *F16C 2204/12* (2013.01); *F16C 2206/02* (2013.01)

(56) References Cited

U.S. PATENT DOCUMENTS

| | | | | |
|---|---|---|---|---|
| 8,075,918 | B2 * | 12/2011 | Hwang | B82Y 30/00 205/238 |
| 2002/0060514 | A1 | 5/2002 | Nakamoto | |
| 2004/0000836 | A1 * | 1/2004 | Okubo | B82Y 10/00 310/252 |
| 2005/0052088 | A1 | 3/2005 | Kakegawa et al. | |
| 2008/0008844 | A1 * | 1/2008 | Bettge | B82Y 30/00 427/576 |
| 2008/0093577 | A1 * | 4/2008 | Khraishi | C09K 5/06 252/67 |
| 2009/0232590 | A1 | 9/2009 | Ersoy et al. | |
| 2010/0179054 | A1 * | 7/2010 | Swager | B01J 21/185 502/162 |
| 2010/0193727 | A1 * | 8/2010 | Lee | C07C 253/30 252/62.55 |
| 2011/0245384 | A1 * | 10/2011 | Bismarck | B82Y 30/00 524/114 |
| 2013/0320274 | A1 * | 12/2013 | Walters | B01J 19/088 252/511 |

FOREIGN PATENT DOCUMENTS

| | | | | |
|---|---|---|---|---|
| DE | 102008056750 A1 | | 5/2010 | |
| GB | 2382631 A | | 6/2003 | |
| GB | 2431709 A | | 5/2007 | |
| JP | 2003239977 A | * | 8/2003 | ............. F16C 33/24 |
| JP | 2004059409 A | * | 2/2004 | ............. B82B 1/00 |
| JP | WO 2004092600 A1 | * | 10/2004 | ............. F16C 17/107 |
| JP | 2005003006 A | * | 1/2005 | |
| JP | 2008214667 A | * | 9/2008 | |
| RU | 2188834 C2 | * | 9/2002 | |
| WO | WO-2010/054619 A2 | | 5/2010 | |
| WO | WO-2011/005693 A1 | | 1/2011 | |
| WO | WO-2011/039095 A1 | | 4/2011 | |

OTHER PUBLICATIONS

English Abstract for WO2011/039095A1.
GB Search Report for GB1121150.5 dated Mar. 25, 2012.
English abstract for DE-102008056750.
International Search Report for PCT/GB2012/053035 dated Feb. 2, 2013.
English Abstract for CN1800668A.
Chinese Office Action for Application No. 2012800603582 (with English translation).
Document D1—Study on preparation and friction and wear properties of a novel carbon nanotube/Pb-based sliding bearing material, Yuming Chen, Abstract, pp. 13-14, 20 and 25-36, Chinese Master's Theses Full-text Database, Engineering Science and Technology II, 2007(05) (with English translation), dated Nov. 15, 2007.
Document D2—Study on friction and wear for the system of carbon nanotube and bismaleimide, Li'na Liu, Chinese Doctoral Dissertations Full-text Database, Engineering Science and Technology I, pp. 9-10, 2011(07) (with English translation), dated Jul. 15, 2011.

* cited by examiner

SLIDING BEARING

CROSS REFERENCE TO RELATED APPLICATION

This application is a U.S. National Phase Application of PCT/GB2012/053035, filed on Dec. 6, 2012, which claims priority to United Kingdom Application 1121150.5, filed on Dec. 8, 2011. The contents of both these applications are hereby incorporated by reference in their entirety.

TECHNICAL FIELD

The present invention relates to sliding bearings having a tin layer or tin-based alloy layer, and more particularly, but not exclusively, to bearing shells and thrust washers.

BACKGROUND

Bearing shells for journaled engine bearings typically comprise a strong steel backing layer, a lining layer, and optional diffusion barrier layer, and an overlay layer that provides the running surface for the journaled shaft, e.g. a hollow generally semi-cylindrical steel backing layer, a copper-based alloy lining layer, and a tin or tin-based alloy overlay on the inner surface. A generally semi-annular thrust flange is provided at each axial end of the bearing shell before being assembled into the bearing of an engine.

It is desirable to provide increased wear resistance and to improve the fatigue strength of layers in bearing linings, particularly overlay layers. A particular challenge to bearing lining layer and/or overlay layer performance is provided by the configuration of vehicle engines to save fuel by using a stop-start operation, in which the engine is stopped each time the vehicle stops, in contrast to conventional engine operation, in which the engine is kept running throughout a vehicle's journey. Engines configured for stop-start operation may restart their engines about one hundred times more frequently than conventionally configured engines run continuously throughout each vehicle journey. The particular problem that an engine configured for stop-start operation presents arises because engine bearings are conventionally hydrodynamically lubricated, with little or no lubrication initially being provided to the bearings when the engine starts, leading to particularly significant wear during the start-up phase.

It has been proposed to increase the wear resistance of engine bearings by the incorporation of hard inorganic micro-particles, which are substantially insoluble in the electroplating electrolyte, into bearing linings. Exemplary materials are the incorporation of aluminium oxide, silicon nitride, silicon carbide or boron carbide hard particulate into a tin-based alloy matrix. However, the production of composite layers with hard particulate in high enough concentrations to be useful is difficult by conventional electroplating techniques, particularly in a tin-based alloy matrix (e.g. at least 50% wt tin), and most particularly in the case of a pure tin matrix (e.g. ≥50% wt tin). Further, such materials commonly suffer from low tensile strength and ductability, as well as particle cracking.

SUMMARY OF THE DISCLOSURE

According to a first aspect, there is provided a sliding bearing having a composite layer comprising carbon nanostructures incorporated within a metallic matrix.

According to a second aspect, there is provided a method of manufacturing a sliding bearing by electroplating comprising providing a sliding bearing substrate as a cathode in an electrolyte within which carbon nanostructures are suspended, and depositing a composite layer of carbon nanostructures embedded in a metallic matrix by applying a cathodic bias to the substrate.

Carbon nanostructures describes members selected from the group consisting of carbon nanotubes, carbon nano-spheres, carbon nano-ellipsoids, functionalised carbon nanotubes, functionalised carbon nano-spheres and functionalised carbon nano-ellipsoids (i.e. carbon nanotubes and like structures).

The carbon nanostructures may comprise carbon nanotubes. The nanotubes may be 0.5 to 30 nm in diameter. The nanotubes may be 1 to 40 µm long. The nanotubes may comprise between 0.1 and 10 % vol of the composite layer. The nanotubes may be at least 100 times longer than their diameter, and optionally at least 1000 times longer than their diameter.

The carbon nanostructures may comprise ball-shaped carbon nanostructures.

The carbon nanostructures may comprise ellipsoidal carbon nanostructures.

The carbon nanostructures may be functionalised carbon nanostructures.

The composite layer may be an overlay layer.

The sliding bearing may comprise a backing layer. The sliding bearing may be provided with a diffusion barrier layer between the composite layer and the backing layer.

The metallic matrix may be a pure metal, apart from incidental impurities. The metallic matrix may be pure Sn, apart from incidental impurities.

The metallic matrix may be a metal alloy, apart from incidental impurities. The metallic matrix may be selected from the group consisting of a Sn-based alloy, a Cu-based alloy, a Bi-based alloy, Pb-based alloy, and an In-based alloy, apart from incidental impurities.

The sliding bearing may be a bearing shell or a thrust washer.

The composite layer may be an electroplated composite layer.

The method may further comprise agitating the electrolyte to maintain the carbon nanostructures in suspension.

A cathodic bias may produce a current density of 0.5 to 10 A/dm$^2$ at the cathode.

The suspension may comprise 0.1 to 30 g carbon nanostructures per litre of electrolyte.

The electrolyte may be a tin methanesulfonic acid electrolyte.

The electrolyte may comprise 15 to 80 g/l Sn.

The electrolyte may comprise brightener.

BRIEF DESCRIPTION OF THE DRAWINGS

Embodiments of the invention are further described hereinafter with reference to the accompanying drawings, in which.

DETAILED DESCRIPTION

Figure 1:
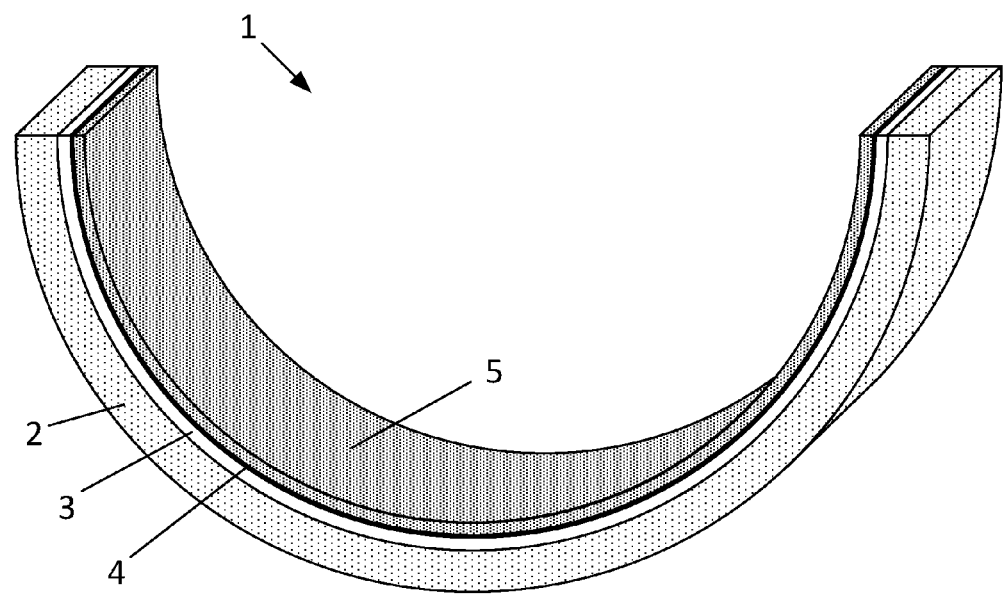
FIG. 1 shows a schematic illustration of a bearing shell.
Figure 2:
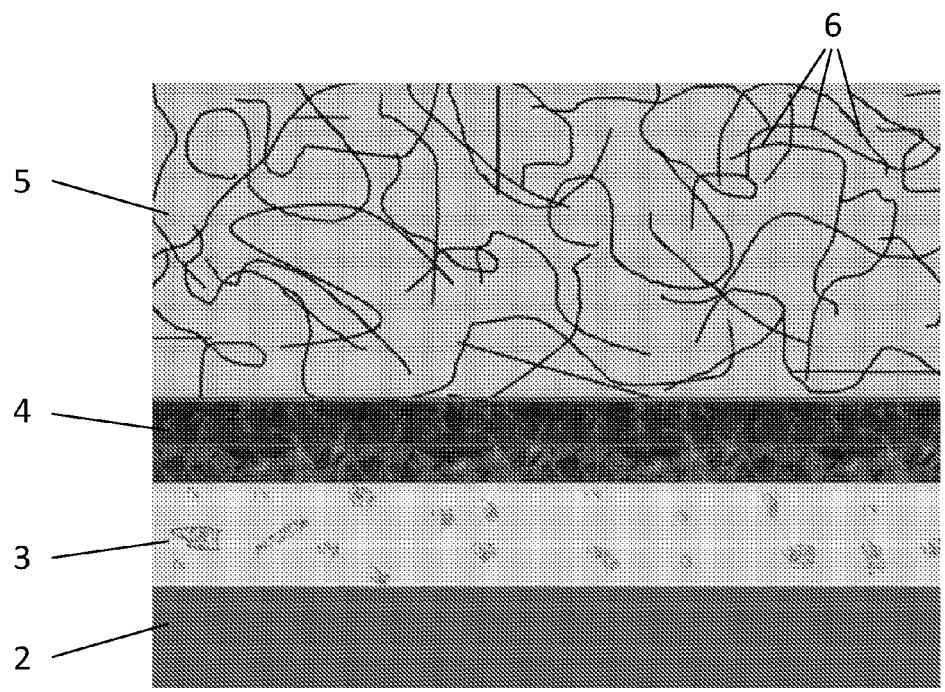
FIG. 2 shows a schematic cross-sectional view through part of the bearing shell of FIG. 1.

FIG. 1 illustrates a hollow, generally semi-cylindrical bearing shell 1 having a steel backing layer 2, a copper-based (e.g. bronze) alloy lining layer 3, a nickel diffusion barrier 4 (to prevent diffusion of tin from the overlay layer into the lining layer), and a composite overlay layer 5 of carbon nanotubes 6 incorporated into a hard tin matrix, which is illustrated further in FIG. 2.

An overlay layer is an exposed layer of a sliding bearing element, and is configured to contact a moving element in a bearing assembly. For example, for a bearing shell, the overlay layer is the innermost layer facing towards a journaled shaft, such as a crankshaft.

A carbon nanostructure is any carbon allotrope composed entirely of carbon, in the form of a hollow sphere, ellipsoid, or tube having a sub-micron diameter. The incorporation of carbon nanostructures into the metallic matrix increases the strength, hardness and wear resistance of the composite overlay layer, whilst still permitting good embedability of any particulate carried in the oil that lubricates the bearing. The exposed carbon nanostructures also increase the lubricious properties of the free surface, reducing friction of the metallic matrix when the journaled shaft contacts the bearing overlay layer, for example when the engine starts and before the lubrication oil has risen to full pressure. Additionally, carbon nanostructures may be more flexible and have higher tensile strength than the micro-particulates that it is currently known to incorporate into a metal matrix to form a composite layer, which may provide reduced particle cracking compared with the known micro-particulates.

The carbon nanostructures also reinforce the metallic matrix. Further, in the case of carbon nanotubes, due to the carbon nanotubes being much longer than their diameter (e.g. having a length that is hundreds or thousands of times longer than the diameter of the tube), when provided in sufficient concentration, the nanotubes in the composite layer become entangled about each other, which further reinforces the metal matrix. Additionally, in the case of carbon nanotubes, they may enhance thermal dissipation through the layer, e.g. away from the free surface of an overlay layer.

The exposure of the carbon nanostructures at the free surface of the bearing overlay layer may also lead to enhanced trapping of oil molecules, improving the lubrication of such a bearing.

Alternatively the carbon nanostructure may be a functionalised carbon nanostructure, such as a functionalised single wall nanotube (SWNT) or multi-wall nanotube (MWNT). For example the carbon nanostructure may be functionalised with an acid side chain, acyl side chain, amine/amide side chain, a fluorinated side chain or an oxidised side chain. Some examples of such structures are single wall nanotubes (SWNT) functionalised with an acid-terminated group (e.g. SWNT-$(CH_2CH_2COOH)_x$), an acyl choride terminated group (e.g. SWNT-$(CH_2CH_2COCl)_x$) or an amine-amide terminated group (e.g. SWNT-$(CH_2CH_2CONHCH_2CH_2NH_2)_x$). In the case of nanotubes, the functionalisation may be sidewall or end-cap functionalised.

Such functionalisation may improve the ability of the carbon nanostructure to stay in suspension within the electrolyte and/or enhance oil trapping performance on the exposed surface of a bearing. Functionalities of the carbon nanostructures may also enhance the incorporation of the nanostructures into the metallic matrix during the electroplating process.

An electroplating method by which the illustrated composite layer can be formed is described.

The bearing shell onto which the composite layer is deposited is provided as a cathode in a bath containing a suspension of carbon nanotubes in an electroplating electrolyte, with an anode formed of a material corresponding to the metallic matrix, e.g. a high purity tin anode.

The electrolyte is a lead-free, tin methanesulfonic acid (MSA) electrolyte (tin ions in methanesulfonic acid), which may comprise overlay quality and performance enhancing additives, such as brightener and anti-foaming agent. For example the electrolyte may be the Bright Tin GBF 30 acidic electrolyte system that is available from Schlötter® Galvanotechnik, and which uses a recipe of Schlötter's ingredients consisting of 13.0 litres Tin Concentrate FS 20 (which contains 310 g/l tin(II)), 6.0 liters GBF 31 Starter (20 to 25% wt 2-naptholpolyglycolether, 1 to 2.5% wt 1,2-dihydroxybenzene, and 1 to 2.5% wt methacrylic acid), 0.4 liters GBR 32 Brightener (35 to 50% wt 2-isopropoxyethanol, and 5 to 10% wt 4-phenylbut-3-en-2-one), 11.0 liters GBF 33 Make Up Concentrate (which is 45% wt MSA), and the balance to 100 liters of deionised water. This forms a solution of 30 to 60 g/l tin, although concentrations of 15 to 80 g/l may be used. The suspension is maintained at a temperature of 20 to 30° C. The chemical composition and pH is maintained during deposition by replenishment of the consumed chemicals.

Carbon nanotubes are suspended in the solution with a concentration of approximately 0.1 to 30 g/l. The carbon nanotubes have a diameter range of approximately 0.5 to 30 nm, and a length range of approximately 1 to 40 μm. Ultrasonic and/or mechanical stirring agitation is used to maintain the nanotubes in suspension.

Cathodic bias drives positively charged tin ions towards the sliding bearing cathode, and deposit the tin ions onto the cathode surface. As the tin deposits, it binds nearby carbon nanotubes onto the growth surface, and leads to the formation of a composite layer of carbon nanotubes incorporated into a tin matrix. The cathodic current density applied is between 0.5 and 10 $A/dm^2$.

Although the illustrated embodiment concerns a composite layer in which carbon nanotubes are incorporated into a metallic matrix of tin or tin-based alloy, other types of carbon nanostructures may alternatively or additionally be incorporated, such as hollow spheres (e.g. $C_{52}$, $C_{60}$, $C_{70}$, $C_{76}$, $C_{84}$, etc.) or ellipsoids.

Although the illustrated embodiment concerns the use of a substantially pure tin matrix, a tin-based alloy (such as a tin-copper alloy) (where the term X-based alloy indicates 50% wt of metal element X) or other metal or metal alloy may be used. For example, the matrix may be binary or ternary tin-based alloys with elements selected from the group consisting of copper, lead, antimony, zinc, bismuth, indium, nickel, iron, cobalt and silver. Alternatively, for example, the metallic matrix may be an alloy selected from the group consisting of copper-based alloy (e.g. copper-based alloy with tin), bismuth-based alloy, lead-based alloy, and indium-based alloy.

The sliding bearing may be a bearing lining or a thrust washer, which is inserted into the bearing assembly of an engine, such as an automotive engine.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding bearing comprising:
   an electroplated composite layer having carbon nanostructures incorporated within a metallic matrix;
   wherein the carbon nanostructures are functionalised carbon nanostructures.

2. A sliding bearing according to claim 1, wherein the carbon nanostructures comprise at least one of carbon nanotubes, ball-shaped carbon nanostructures, and ellipsoidal carbon nanostructures.

3. A sliding bearing according to claim 1, wherein the composite layer is an overlay layer.

4. A sliding bearing according to claim 1, wherein the metallic matrix comprises a pure metal, apart from incidental impurities.

5. A sliding bearing according to claim 4, wherein the pure metal is tin.

6. A sliding bearing according to claim 1, wherein the metallic matrix comprises a metal alloy, apart from incidental impurities.

7. A sliding bearing according to claim 6, wherein the metal alloy is at least one of a tin-based alloy, a copper-based alloy, a bismuth-based alloy, lead-based alloy, and an indium-based alloy.

8. A sliding bearing according to claim 1, wherein the sliding bearing is at least one of a bearing shell and a thrust washer.

9. A sliding bearing according to claim 1, wherein the functionalised carbon nanostructures have a structural unit including at least one of an acid side chain, an acyl side chain, an amine-amide side chain, a fluorinated side chain, and an oxidized side chain.

10. A method of manufacturing a sliding bearing, the sliding bearing having an electroplated composite layer comprising carbon nanostructures incorporated within a metallic matrix, wherein the carbon nanostructures are functionalised carbon nanostructures, the method comprising:
    providing a sliding bearing substrate as a cathode in an electrolyte within which carbon nanostructures are suspended; and
    depositing a composite layer of carbon nanostructures embedded in a metallic matrix by applying a cathodic bias to the substrate;
    wherein the carbon nanostructures are functionalized carbon nanostructures.

11. A method according to claim 10, wherein the cathodic bias produces a current density of 0.5 to 10 $A/dm^2$ at the cathode.

12. A method according to claim 10, wherein the carbon nanostructures are suspended within the electrolyte in a density ranging from 0.1 g to 30 g carbon nanostructures per liter of electrolyte.

13. A method according to claim 10, wherein the metallic matrix is a pure metal, apart from incidental impurities.

14. A method according to claim 13, wherein the pure metal is tin.

15. A method according to claim 10, wherein the metallic matrix is a metal alloy, apart from incidental impurities.

16. A method according to claim 15, wherein the metal alloy is a tin-based alloy.

17. A method according to claim 10, wherein the electrolyte is a tin methanesulfonic acid electrolyte.

18. A method according to claim 10, wherein the electrolyte comprises 15 to 80 g/l tin.

19. A method according to claim 10, wherein the electrolyte comprises brightener.

20. A method according to claim 10, wherein the sliding bearing is at least one of a bearing shell and a thrust washer.

21. A sliding bearing, comprising:
    a backing layer;
    an electroplated composite layer including carbon nanostructures incorporated within a metallic matrix, wherein the carbon nanostructures are functionalised carbon nanostructures; and
    a diffusion barrier layer disposed between the backing layer and the electroplated composite layer.

* * * * *